(12) United States Patent
Chen et al.

(10) Patent No.: US 8,465,797 B2
(45) Date of Patent: Jun. 18, 2013

(54) METHOD TO FABRICATE HIGH PERFORMANCE TUBULAR SOLID OXIDE FUEL CELLS

(75) Inventors: Fanglin Chen, Irmo, SC (US); Chenghao Yang, Columbia, SC (US); Chao Jin, Columbia, SC (US)

(73) Assignee: University of South Carolina, Columbia, SC (US)

( * ) Notice: Subject to any disclaimer, the term of this patent is extended or adjusted under 35 U.S.C. 154(b) by 207 days.

(21) Appl. No.: 13/008,081

(22) Filed: Jan. 18, 2011

(65) Prior Publication Data

US 2011/0177234 A1 Jul. 21, 2011

Related U.S. Application Data

(60) Provisional application No. 61/336,105, filed on Jan. 15, 2010.

(51) Int. Cl.
*B05D 5/12* (2006.01)
*B05D 3/02* (2006.01)
*B05D 7/22* (2006.01)

(52) U.S. Cl.
USPC .......................... 427/115; 427/230; 427/372.2

(58) Field of Classification Search
USPC ...................... 427/115, 230, 372.2
See application file for complete search history.

(56) References Cited

U.S. PATENT DOCUMENTS

2007/0141447 A1* 6/2007 Crumm et al. ................. 429/44

FOREIGN PATENT DOCUMENTS

WO WO 2010/103269 * 9/2010

OTHER PUBLICATIONS

Droushiotis et al. "Charaterization of NiO-yttria stabilized zirconia (YSZ) hollow fibers for use as SOFC anodes", Solid State Ionics, vol. 180 (2009) pp. 1091-1099.*

Kim et al. "Fabrication and Characteristics of anode supported flat-tube solid oxide fuel cell", Journal of Power Sources, vol. 122, (2003) pp. 138-143.*

Adler, "Factors Governing Oxygen Reduction in Solid Oxide Fuel Cell Cathodes", Chemical Reviews, vol. 104, No. 10, Oct. 2004, pp. 4791-4843.

Calise et al., "Experimental Analysis of Micro-tubular Solid Oxide Fuel Cell Fed by Hydrogen", Journal of Power Sources, vol. 195, No. 4, Feb. 2010, pp. 1163-1170.

Dönitz et al., "Concepts and design for Scaling Up High Temperature Water Vapour Electrolysis", International Journal of Hydrogen Energy, vol. 7, No. 4, 1982, pp. 321-330.

Droushiotis et al., "Characterization of NiO—yttria Stabilised Zirconia (YSZ) Hollow Fibres for Use as SOFC Anodes", Solid State Ionics, vol. 180, Nos. 17-19, Jul. 2009, pp. 1091-1099.

Ebbesen et al., "Electrolysis of Carbon Dioxide in Solid Oxide Electrolysis Cells" Journal of Power Sources, vol. 193, No. 1, Aug. 2009, pp. 349-358.

Funahashi et al., "New Fabrication Technique for Series-Connected Stack with Micro Tubular SOFCs", Fuel Cell, vol. 9, No. 5, pp. 711-716.

(Continued)

*Primary Examiner* — Brian K Talbot
(74) *Attorney, Agent, or Firm* — Dority & Manning, P.A.

(57) ABSTRACT

In accordance with the present disclosure, a method for fabricating a solid oxide fuel cell is described. The method includes forming an asymmetric porous ceramic tube by using a phase inversion process. The method further includes forming an asymmetric porous ceramic layer on a surface of the asymmetric porous ceramic tube by using a phase inversion process. The tube is co-sintered to form a structure having a first porous layer, a second porous layer, and a dense layer positioned therebetween.

6 Claims, 2 Drawing Sheets

OTHER PUBLICATIONS

Haile, "Fuel Cell Materials and Components", Acta Materialia, vol. 51, No. 19, 2003, pp. 5981-6000.

Hauch et al., "Performance and Durability of Solid Oxide Electrolysis Cells" Journal of the Electrochemical Society, vol. 153, No. 9, Jul. 2006, pp. A1741-A1747.

Jensen et al., "Hydrogen and Synthetic Fuel Production from Renewable Energy Sources", International Journal of Hydrogen Energy, vol. 32, No. 15, Oct. 2007, pp. 3253-3257.

Kesting, R.E.; Fritzsche, A.K.; "Polymeric Gas Separation Membranes", John Wiley & Sons, Inc., 1993.

Kim et al., "Fabrication and Characteristics of Anode-Supported Flat-Tube Solid Oxide Fuel Cell", Journal of Power Sources, vol. 122, No. 2, Jul. 2003, pp. 138-143.

Lawlor et al., "Corrigendum to Review of the Micro-tubular Solid Oxide Fuel Cell Part I. Stack Design Issues and Research Activities", Journal of Power Sources, vol. 193, No. 2, Sep. 2009, pp. 387-399.

Li et al., "Superior Gas separation Performance of Dual Layer Hollow Fiber Membranes with an Ultrathin Dense-selective Layer", Journal of Membrane Science, vol. 325, No. 1, Nov. 2008, pp. 23-27.

Loeb et al., "Seawater Demineralization by Means of an Osmotic Membranes", Saline Water Conversion-II, Chapter 9, Jan. 1963, 117-132.

Mori et al., "$La_{0.6}Sr_{0.4}Co_{0.2}Fe_{0.8}O_{3-\delta}$ Current Collectors via Ag Infiltration for Microtubular Solid Oxide Fuel Cells with Intermediate Temperature Operation", Journal of the Electrochemical Society, vol. 156, No. 10, 2009, pp. B1182-B1187.

Skinner, "Recent Advances in Perovskite-Type Materials for Solid Oxide Fuel Cell Cathodes", International Journal of Inorganic Materials, vol. 3, No. 2, Mar. 2001, pp. 113-121.

Suzuki, et al., "Impact of Anode Microstructure on Solid Oxide Fuel Cells", Science, vol. 325, No. 5942, Aug. 2009, pp. 852-855.

Yang et al., "Fabrication and Characterization of $Ce_{0.8}Sm_{0.2}O_{1.9}$ Microtubular Dual-Structured Electrolyte Membranes for Application in Solid Oxide Fuel Cell Technology", Journal of the American Ceramic Society, vol. 92, Issue 11, Nov. 2009, pp. 2544-2550.

Zhan et al., "Syngas Production by Coelectrolysis of $CO_2/H_2O$: The Basis for a Renewable Energy Cycle", Energy & Fuels, vol. 23, No. 6, 2009, pp. 3089-3096.

* cited by examiner

METHOD TO FABRICATE HIGH PERFORMANCE TUBULAR SOLID OXIDE FUEL CELLS

CROSS-REFERENCE TO RELATED APPLICATION

The present application is based on and claims priority to U.S. Provisional Application 61/336,105 having a filing date of Jan. 15, 2010, which is incorporated by reference herein.

GOVERNMENT SUPPORT CLAUSE

This invention was made with government support under DE-SC001061 awarded by U.S. Department of Energy. The government has certain rights in the invention.

BACKGROUND

Solid oxide fuel cells (SOFCs) have been considered one of the promising candidates for the next generation of power sources due to their high electrical and thermal efficiencies, environmentally benign characteristics, and fuel flexibility. For the last century, work has been focused on improving the power output and producing compact designs for SOFCs.

Planar and tubular cell geometries are the two main SOFC designs. Tubular SOFCs, especially micro-tubular SOFCs, have attracted much attention due to their ease in sealing and gas manifolding, tolerance for thermal cycling, quick start up and shut down capability, and potential for high volumetric power density. These advantages make them suitable for a variety of applications such as cogeneration as well as power sources for transportation and portable devices.

On the other hand, SOFCs have been reported to be reversible and can be operated in solid oxide electrolysis cells (SOECs) as a mode for hydrogen ($H_2$) generation. Tubular SOECs offer a potentially viable alternative for large scale and high-purity hydrogen generation by splitting water into hydrogen and oxygen. In addition, production of syngas ($CO+H_2$) using high temperature co-electrolysis of steam and $CO_2$ has the promise to create a new paradigm in $CO_2$ sequestration.

Although theoretical and laboratory studies of tubular SOFCs have been pursued for over 40 years, the design and manufacture of tubular SOFCs are still key technical issues that have not been satisfactorily resolved. Great attention has been paid to the phase-inversion method to prepare asymmetric membranes widely used in fiber, gas separation etc., for its simple process and the relatively inexpensive equipment involved. Recently the phase-inversion process has been applied in the SOFC field to fabricate ceramic hollow fiber electrolyte, where dense electrolyte and porous electrode bilayers can be produced from a co-sintering step.

Consequently, a novel approach to fabricate economical high performance tubular SOFC is desirable.

SUMMARY

In accordance with the present disclosure, a method for fabricating a solid oxide fuel cell is described. The method includes forming an asymmetric porous ceramic tube by using a phase inversion process. The method further includes forming an asymmetric porous ceramic layer on a surface of the asymmetric porous ceramic tube by using a phase inversion process. The tube is co-sintered to form a structure having a first porous layer, a second porous layer, and a dense layer positioned therebetween.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

In accordance with the present disclosure, a phase-inversion and one step co-sintering method are described to fabricate a porous/dense/porous tri-layer ceramic structure tubular SOFCs and SOECs. Each of the porous electrodes is asymmetric and is composed of two different layers: a thick porous layer with large pores as a mass transport layer and a thin porous layer with small pores as an electrode function layer.

Figure 1:
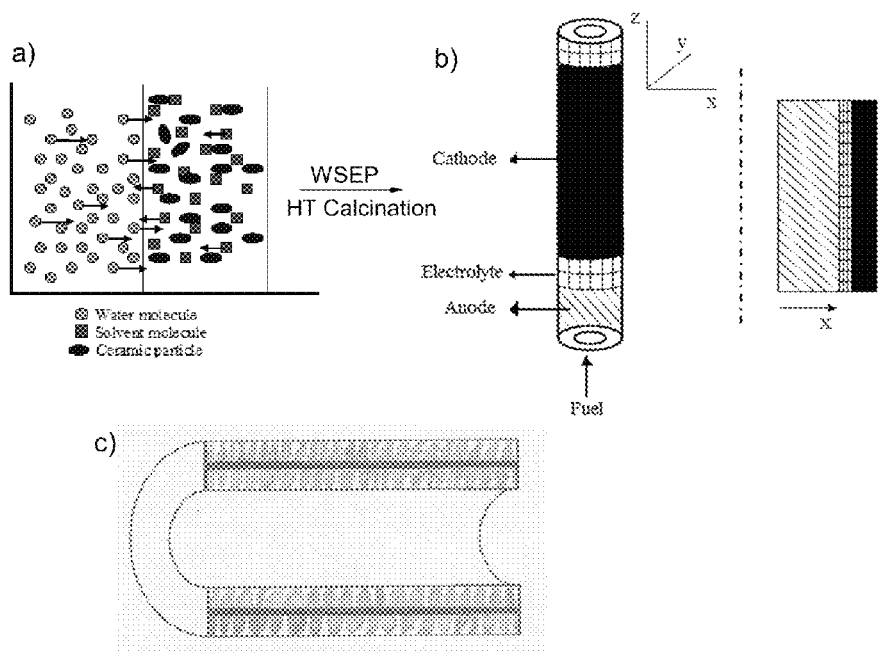
FIG. 1 illustrates the phase-inversion and co-sintering process wherein a) the water molecules-spinning solution molecules exchange process (WSEP) when the ceramic-spinning solution tubular precursor is dipped into water; b) the tubular precursor is sintered at 1500° C.; c) cross-section of the porous/dense/porous tri-layer structure ceramic tube in accordance with certain aspects of the present disclosure.

Described herein is a hard template free, simple but versatile way to obtain a porous/dense/porous tri-layer tubular ceramic structure through a phase inversion and co-sintering process. FIG. 1 illustrates a process for creating such a structure in accordance with the present disclosure.

A spinning solution that can be easily dissolved into water can be utilized in connection with the present disclosure. A ceramic-spinning solution tubular precursor can be dipped into water, with the water molecules and the spinning solution molecules exchanging due to the concentration difference resulting in a water molecule and spinner molecule separation process (WSEP). The exchange speed near the surface can be faster than that inside the wall. Therefore, during the exchange process, many small channels are formed in the surface layer, with fewer but larger channels being formed inside. The ceramic materials can serve as the backbone of the structure. After heat-treatment at about 1200° C. or greater, an asymmetric porous ceramic tube is formed.

Next, a layer of ceramic-spinning solution can be coated onto the inner surface of the above porous ceramic tube, with water being injected into the tube. The previous WSEP occurs again, and a similar asymmetric porous ceramic layer is formed on the inner surface. After being sintered at a high temperature (HT), the thin layer with many small channels can become dense, and a porous/dense/porous tri-layer ceramic tube is obtained.

The present disclosure can be better understood with reference to the following examples.

EXAMPLES

Figure 2:
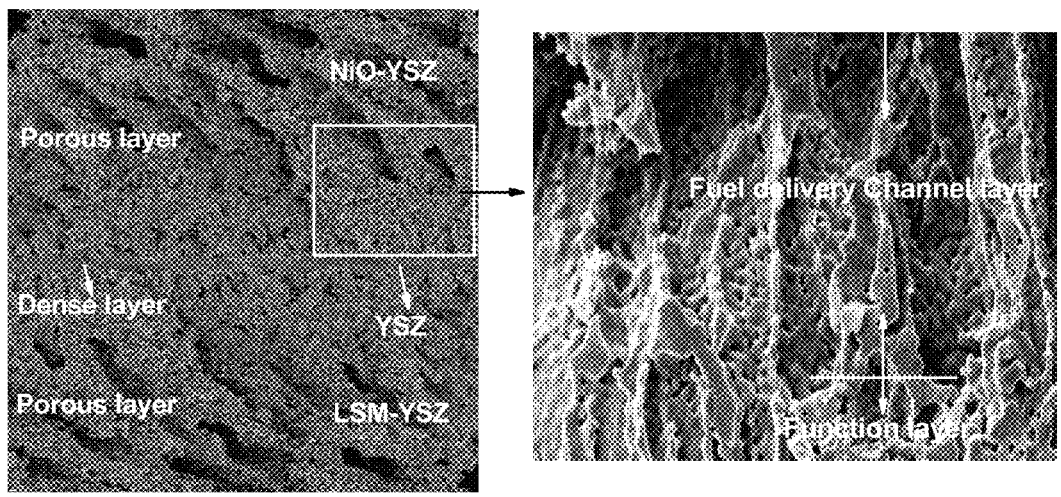
FIG. 2 illustrates an SEM of the asymmetric porous structure of Ni-YSZ/YSZ/LSM-YSZ micro-tubular SOFC Ni-YSZ electrode in accordance with certain aspects of the present disclosure.

NiO (Sigma-Aldrich, USA) and YSZ (8 mol % $Y_2O_3$, Tosoh Company, Japan) powders (weight ration 3:7) were mixed with ethanol by ball milling for 24 h and then dried. Meanwhile, polyethersulfone (PESO (99.9%, China) polymer binder was dissolved into Nmethyl-2-pyrrolidone (NMP) (HPLC grade, Sigma Aldrich) solvent to form a spinning solution, with PESf to NMP weight ratio 1:5. YSZ powders were added to PESf-NMP solution and milled to obtain one kind of viscous slurry, the weight ratio of YSZ to PESf-NMP solution was 1:1. A custom designed spinneret with an orifice dimension/inner diameter of 3.0/2.0 mm was used to obtain a precursor tube. The precursor tube was then immersed into a water bath to perform water molecules-spinning solution molecules exchange process (WSEP), resulting in an asymmetric porous ceramic tube. The asymmetric porous ceramic tube was washed for several times to remove the excess solvent, dried and fired at a moderate temperature. Another layer of LSM-YSZ slurry was subsequently coated onto the inner surface of the porous ceramic tube by repeating the previous process. Finally, the obtained precursor asymmetric porous ceramic tube was fired at 600° C. for 2 h to remove the organic binder and co-sintered at 1500° C. to form the porous/dense/porous tri-layer structure. There are two distinct parts in each porous layer: one layer with small pores close to the electrolyte is considered as the functional layer and the layer with much larger pores serves as mass transport layer, as shown in FIG. 2. With these kinds of porous layers, SOFCs and SOECs gas diffusion losses in the electrodes would be minimized, and the gas utilizing efficiency can be maximized. Moreover, the thickness of each layer can be controlled.

The advantages of this novel tubular SOFC fabrication method in comparison with the other ceramic tube preparation methods are the following: (1) the porous/dense/porous asymmetric tri-layer ceramic structure can be obtained with this phase-inversion and one step co-sintering process; (2) the thickness of each layer, as well as the shape and size of the pores can be controlled; (3) the composition of the porous layer could be either one component or a composite with multiple components; (4) the size and shape of the ceramic tube could be designed and fabricated with this method; (5) the fabrication process is simple with no expensive equipments involved, and the process is very reproducible with the tube yield more than 95%; (6) this phase-inversion and co-sintering process produces intimate contact and good connectivity between the dense electrolyte and porous electrode backbone. The electrolyte material plays several important roles within the porous electrode backbone: 1) provides ionic conductivity and enhances the electrochemically active region in the electrode; 2) provides a "bridge" for ions moving between the electrolyte and electrodes; 3) helps improve thermal expansion match between the electrolyte and electrodes.

Figure 3:
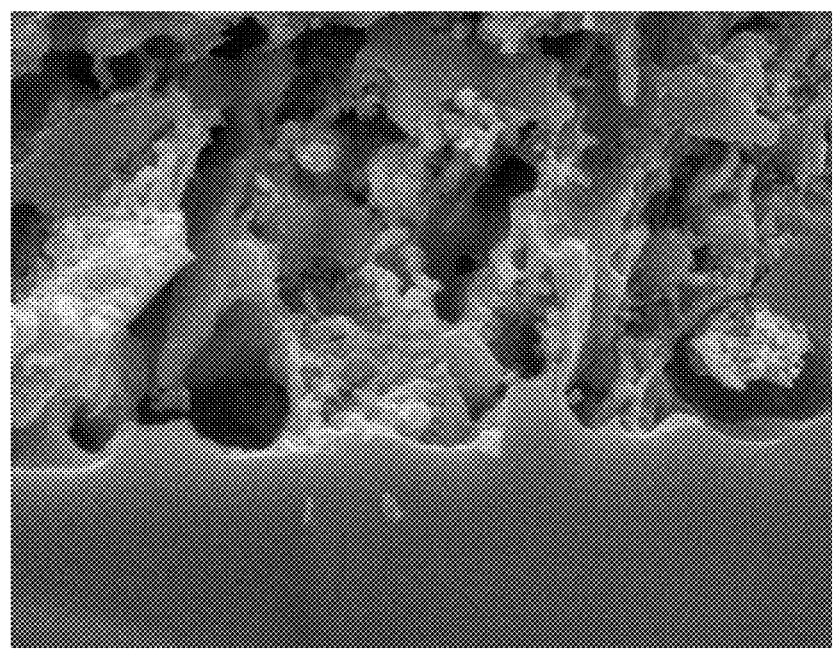
FIG. 3 illustrates a cross-section SEM photograph of SOFCs electrode coated with catalysts in accordance with certain aspects of the present disclosure.

In addition, the Ni/YSZ/gas and LSM/YSZ/gas three phase boundaries (TPBs) can be greatly extended in the anode and cathode by infiltrating appropriate catalysts in the porous electrode substrate, as shown in FIG. 3. Consequently, the overall electrical conductivity as well as the reaction rate can be improved and the overall performance losses can be minimized, resulting in high performance tubular solid oxide cells.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A method for fabricating a solid oxide fuel cell comprising:
   forming an asymmetric porous ceramic tube by using a phase inversion process;
   forming an asymmetric porous ceramic layer on an inner surface of the asymmetric porous ceramic tube by using a phase inversion process in the presence of water; and
   co-sintering the tube to form a structure having a first porous layer, a second porous layer, and a dense layer positioned therebetween.

2. The method of claim 1, wherein the tube comprises electrolyte material.

3. The method of claim 1, wherein one or more of the porous layers comprise a catalyst.

4. The method of claim 1, wherein the tube is co-sintered at a temperature of greater than about 1000° C.

5. The method of claim 1, wherein the tube is co-sintered at a temperature of greater than about 1100° C.

6. The method of claim 1, wherein the tube is co-sintered at a temperature of greater than about 1200° C.

* * * * *